Oct. 7, 1924.  
W. P. DUN LANY ET AL  
1,510,470  
STEREOSCOPE  
Filed Feb. 20. 1920  
3 Sheets—Sheet 1

Oct. 7, 1924.

W. P. DUN LANY ET AL 1,510,470

STEREOSCOPE

Filed Feb. 20, 1920

3 Sheets-Sheet 3

Inventors
William P. Dun Lany
Stephen G. Wood.
By Miller Chindahl Parker
Attys.

Patented Oct. 7, 1924.

1,510,470

UNITED STATES PATENT OFFICE.

WILLIAM P. DUN LANY, OF OAK PARK, AND STEPHEN G. WOOD, OF CHICAGO, ILLINOIS; MARGARET MORAN DUN LANY ADMINISTRATRIX OF SAID WILLIAM P. DUN LANY, DECEASED.

STEREOSCOPE.

Application filed February 20, 1920. Serial No. 360,052.

*To all whom it may concern:*

Be it known that we, WILLIAM P. DUN LANY and STEPHEN G. WOOD, citizens of the United States, residing at Oak Park and Chicago, respectively, in the county of Cook and State of Illinois, have invented certain new and useful Improvements in Stereoscopes, of which the following is a specification.

Our invention relates to stereoscopes and particularly to an improved universal stereoscope capable of use at the will of the operator for any one of the various purposes for which such instruments are usually employed.

One of the objects of our invention is to provide a magazine stereoscope in which a series of pictures may be viewed conveniently without unloading and reloading the machine each time it is desired to change a picture.

Another object is to provide means for viewing either transparencies or prints.

Another object is to provide an improved means for presenting to the person using the machine an apparently colored view without the use of colored transparencies, which are expensive. The possibility of attaining the object just referred to results from the fact that the same object may be viewed with each eye with its different parts illuminated to different intensities, the view presented to each eye being all of a certain color; to produce the illusion in the observer that the various parts of the object are colored as they would be by the blending of the two colors presented to the eyes in the various intensities of illumination provided for the purpose.

Further objects and advantages of our invention will become apparent as the description proceeds.

Figure 1:
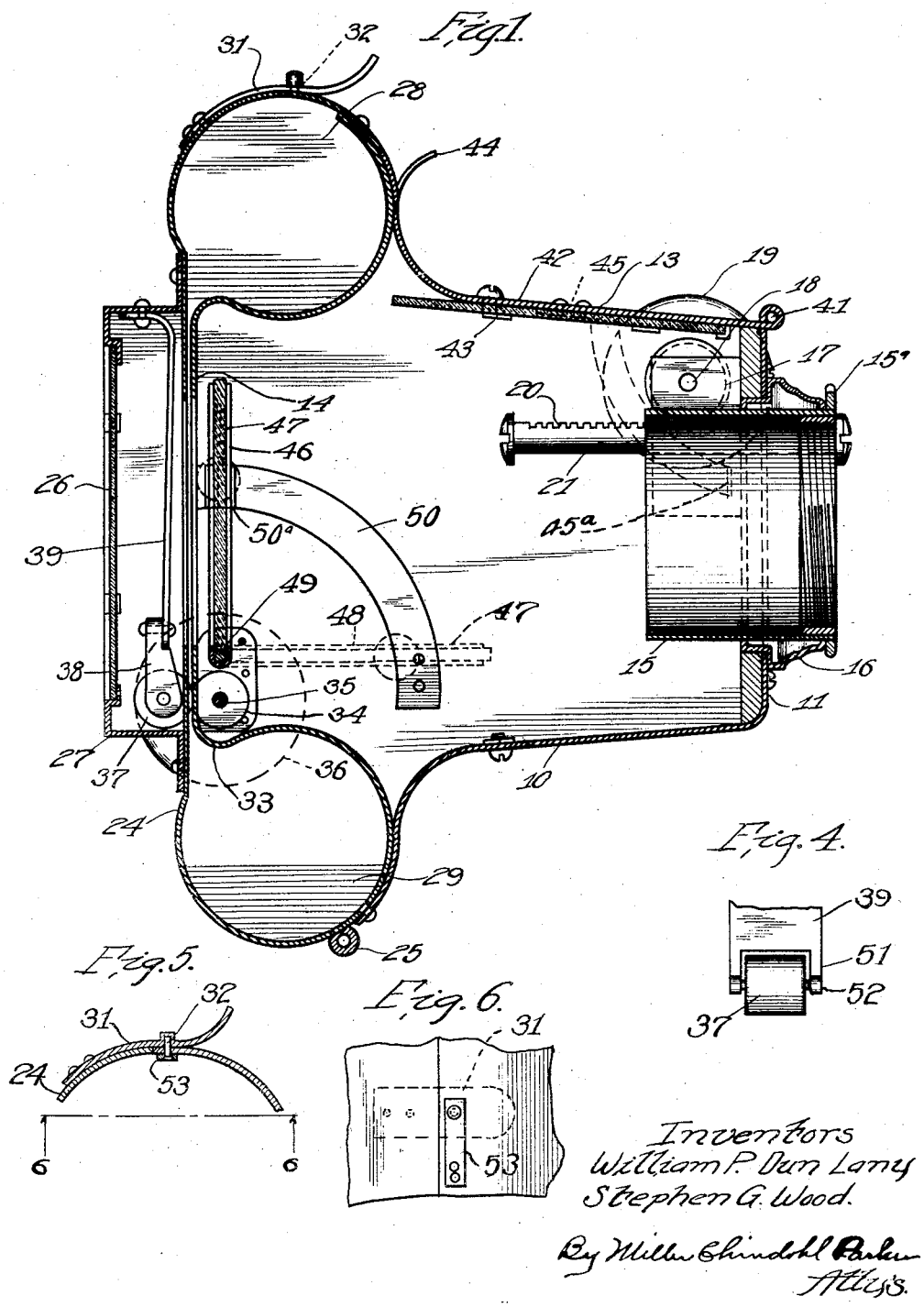
Figure 2:
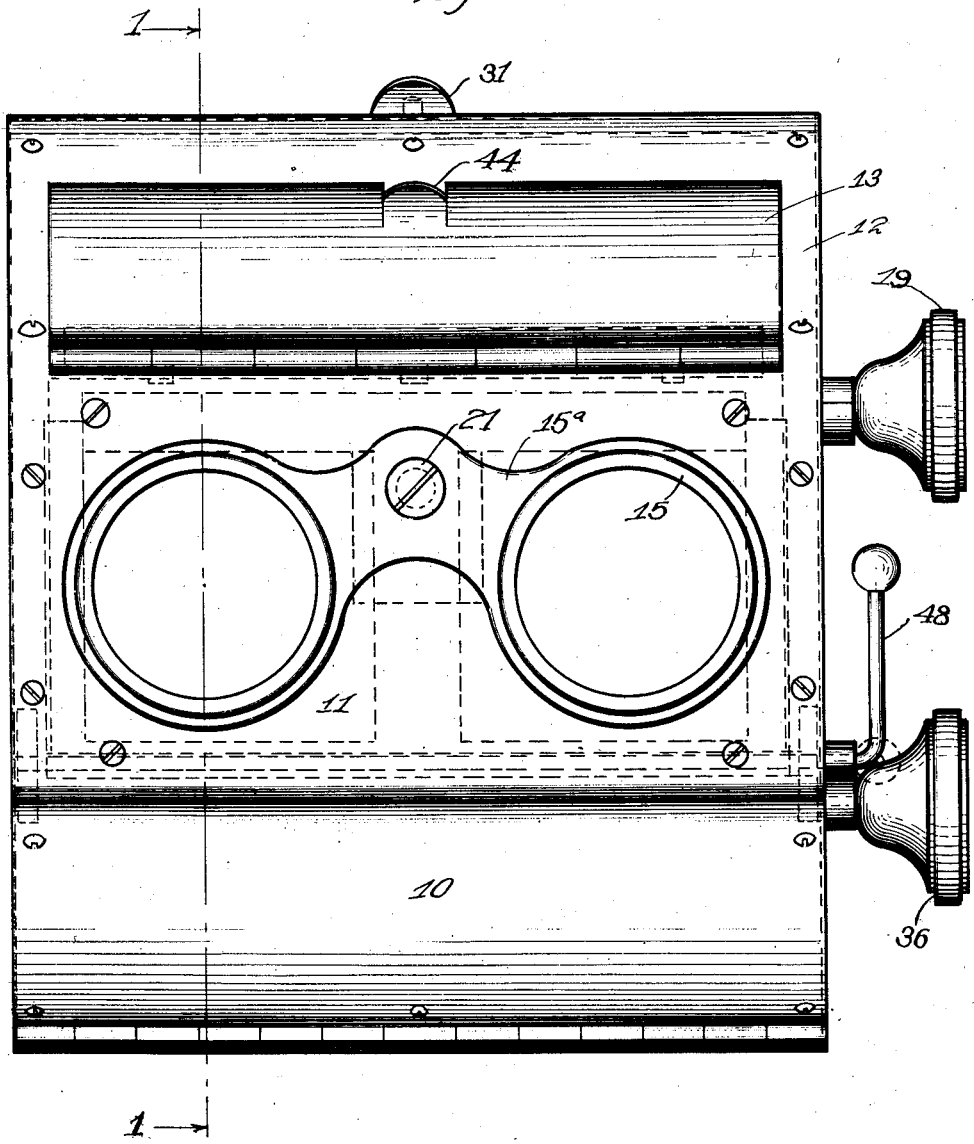
Figure 3:
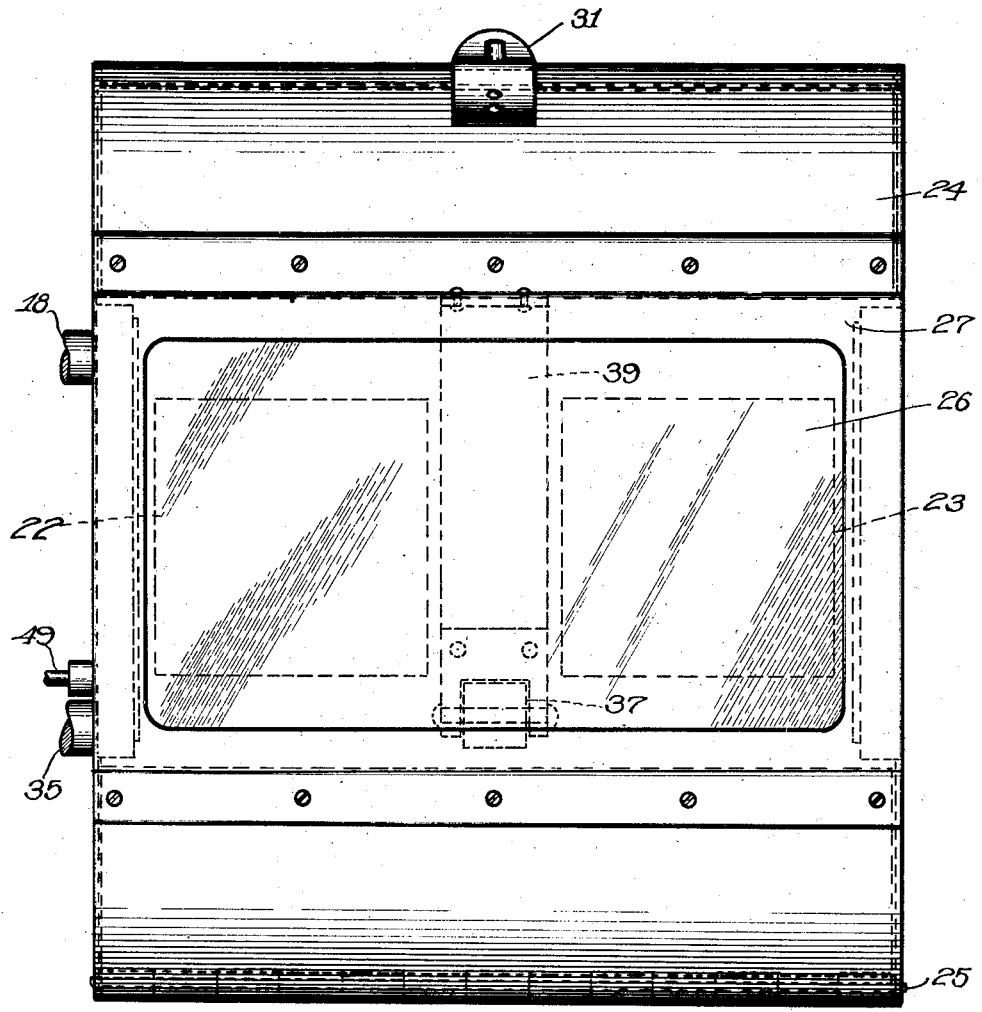

In the accompanying drawings, Figure 1 is a section on the line 1—1 of Fig. 2 of a device constructed according to our invention. Fig. 2 is a view of the front of the device where the operator places himself, and Fig. 3 is a rear view thereof. Figs. 4, 5 and 6 are detail views.

In the embodiment of our invention selected for illustration the improved stereoscope comprises a main casing substantially T-shaped made up of a bottom 10 and front wall 11 formed in one piece, an open top frame 12 closed by a door 13, and a rear wall 14. A suitable lens-holding frame 15 is slidably mounted in a frame 16 secured to the front wall of the stereoscope, and may be moved longitudinally by a small pinion 17 carried on a shaft 18 operated manually by means of a wheel 19 to engage rack teeth 20 in a longitudinal bolt or rod 21 and properly focus the lenses. A crosspiece 15ª shaped like a spectacle frame unites the frame 15 and the bolt 21 into a unitary structure. Any suitable set of lenses may be mounted in the lens holder 15. Inasmuch as the construction of the lenses themselves forms no part of our present invention, a detailed description thereof is deemed unnecessary.

The rear wall 14 contains two apertures 22 and 23 through which the transparencies or prints are to be viewed by the observer. An outer rear frame 24 pivoted at 25 carries a ground glass 26 mounted in spaced relation with respect to the apertures 22 and 23 in a small auxiliary box-shaped holder 27. As clearly illustrated in Fig. 1, the rear wall 14 and the pivoted frame 24 have opposing arcuate portions at their upper and lower ends defining cylindrical enclosures 28 and 29 when the pivoted frame 24 is in the position illustrated. The pivoted frame extends adjacent to the straight central portion of the rear wall 14 containing the apertures 22 and 23 and is itself apertured to correspond. The transparency or film is passed between the slightly spaced straight portions of the rear frame 24 and the rear wall 14.

Suitable means for loading and unloading the film or print rolls are provided. The pivoted frame 24 is held in place by a spring catch 31 engaging a projection 32 carried by the rear wall 14 and may be disengaged and swung outwardly and downwardly to permit a roll of films or prints to be placed in the upper cylindrical enclosure 28. The end of the roll is drawn down across the apertures in the rear wall 14 and preferably a trifle past the projecting hump 33 formed where the straight part of the rear wall merges into the lower cylindrical portion. The pivoted frame 24 is then moved back to the position shown in Fig. 1 and the apparatus is ready for use.

A small feed roller 34 is rigidly mounted on an axle 35 and may be rotated by means of a hand wheel 36. A cooperating feed roller 37 is resiliently mounted in the box-like casing 27 supported as illustrated in a small clip 38 fastened to the end of a leaf spring 39. By turning the hand wheel 36 the rollers 34 and 37 will engage the film or print and slide it down into the lower receptacle where it will roll up. When all the pictures have been viewed, the pivoted frame 24 may be swung back and the used roll removed from the enclosure 29 and a different one placed in the upper enclosure 28.

In Fig. 4 we have shown a very simple alternate construction for supporting the roller 37. As illustrated, the leaf spring 39 is cut away at its end, leaving two projecting arms 51 at its sides. These arms may be annealed and bent to form journals 52 for the axle carrying the roller 37. In Figs. 5 and 6 I have illustrated an advantageous modification of the catch for holding the pivoted frame 24 in place. In this construction the pin 32 is carried by the small leaf spring 53 which yields much more easily than the outer spring 31. Upon closing the device the pin 32 will be depressed by the relatively rigid spring 31 engaging its projecting tip, and will snap into locking position. To open the frame, however, it will be necessary to lift the spring 31 clear of the pin 32.

In viewing transparencies the operator will stand or sit facing a window or other source of light and after inserting the film roll and adjusting the lenses by means of hand wheel 19 will hold the device to his eyes with his left hand and with his right hand operate the feed hand wheel 36 to move the pictures successively into view.

In case opaque prints are to be similarly viewed it is necessary to illuminate the side of the print toward the operator. For this purpose we have provided a door 13 occupying most of the area of the upper wall of the body and suitably pivoted at 41 at the upper front edge of the body. The door 13 carries a mirror 42 suitably fastened to it as by means of clamping lugs 43 and has a handle in the nature of a small curved projecting portion 44 which may be grasped by the operator to raise the door. Leaf springs 45 carried by the door at each side rub against the edges of the door opening when the door is raised to frictionally hold it in any position to which it is moved. A small lateral projection 45ª at the end of each spring 45 forms a hook to engage the frame 12 and limit the opening movement of the door.

In viewing prints the print roll is inserted precisely as the film roll would be and the operator may remain in the same position as when viewing films and raise the mirror to the proper angle to catch the light and illuminate the print by reflection.

In addition to the above described means for viewing films or prints we have provided special means for viewing stereoscopic films so taken as to permit of their being presented to the operator as colored views without the prints themselves being colored. For this purpose we provide a pivoted holder 46 containing colored glass plates 47 adapted to cover the apertures 22 and 23. When not in use this holder lies horizontally as indicated in dotted lines in Fig. 1. It may be raised to vertical position by means of a projecting handle 48 formed by a laterally projecting portion on the end of the shaft 49, and held in vertical position by engagement with a notch 50ª in a leaf spring 50 provided for the purpose.

The films to be used for presenting colored views are taken in a stereoscopic camera in which a red glass or screen is associated with one lens of the camera and a green glass with the other lens. The intensities of the various parts of the picture in the resulting prints will not correspond to the total light received from them, but rather to the light of such wave lengths as are not intercepted by the screens.

When the positive made from such a film is placed in the stereoscope the side taken through a red ray filter is viewed through a red glass and the side taken through the green filter through a green glass. Parts of the original object which were red will therefore be seen by the operator through the red glass and not through the green and will therefore appear red. Similarly, green objects will be strongly shown through the green glass and practically not at all through the red, and therefore will appear green. Parts having other colors will be represented on the transparency by parts of varying density corresponding to the portion of the light coming from them which was not filtered out by the ray filters and will therefore be seen with both eyes in varying intensities. The sensation produced by the light received will result in the illusion that these portions will appear as if illuminated by the combined illumination coming to both eyes of the operator, thus producing various other colors in the spectrum besides red and green.

It will be seen that we have provided an improved stereoscope capable of performing efficiently all the different functions discussed above. In its mechanical construction our improved device is relatively simple and durable, cheap to manufacture and easy to assemble.

While we have described and illustrated in detail a specific embodiment of our invention, it should be clearly understood that the description is only for purposes of illustration and that many modifications and variations will naturally occur to those skilled in the art. It will, for instance, be obvious that the words red and green as above used denote merely portions of the spectrum. Any screen or filter may have its optical properties correctly expressed by a curve or graph indicating, for all the wave lengths of the spectrum, the portion of the incident light which will pass through the screen. The screens used may be selected to secure the best blending of all colors as viewed by the user, regardless of their apparent color, without departing from the principles of our invention. We aim in the subjoined claims to cover all such legitimate variations and modifications.

We claim as our invention:

1. In a device of the class described, a casing having apertures in its rear wall, a frame pivotally secured to said casing and positioned close to said rear wall, means for feeding material past said apertures between said casing and said frame, lenses supported by said casing for viewing said material through said apertures, and means pivotally mounted within said casing to support glass of different colors before the lens for each eye of the observer to create an illusion as to the coloring of the material fed past said apertures.

2. In a device of the class described, a casing having apertures, a frame pivotally mounted to said casing adjacent to said apertures, means for feeding material past said apertures outside of said casing on the inside of said frame, adjustable light reflector means forming part of said casing when not in use and adapted to reflect light on said material, and means within said casing to support screens of different colors before the eyes of the observer in order to secure a blend of colors in the object being viewed.

3. In a device of the class described, a casing having apertures, a frame on one end of said casing, means for feeding material past said apertures between said casing and said frame, adjustable light reflecting means adapted to reflect light on said material, and a holder pivotally mounted in said casing to support screens of different colors before the eyes of the observer to create an illusioning blending of colors in the object being viewed.

4. A hand supportable stereoscope comprising a substantially T-shaped casing adapted to be held in one hand to the eyes with the transverse portion of the casing remote, said casing having apertures at opposite ends, a holder for objects to be viewed mounted in said casing in back of said transverse portion between said apertures, a normally horizontal colored glass in said casing hinged at one edge and adapted to be moved to a vertical position in front of said holder, a control element for manipulating said glass projecting outside the casing on the right hand side, a door hinged at its forward edge in the upper wall of said casing arranged when in closed position to constitute a part of said casing, a light reflector on said door, means for adjusting said reflector and means for frictionally holding the same in its adjusted position, spaced magazines in the opposite ends of the transverse part of said casing, and means between said magazines operable from the right hand side outside of said casing for moving the objects to be viewed through said holder from one magazine to the other, light diffusing means in the aperture at one end of said casing in front of said holder, and means in the opposite aperture in back of said holder for viewing the objects therein comprising a spectacle frame, lenses in said frame, said frame comprising a nose piece protruding from said casing, and means interposed between said nose piece and said casing for adjusting said lenses comprising a member engageable at the right hand side outside said casing.

5. A hand supportable stereoscope comprising a substantially T-shaped casing adapted to be held to the eyes with the transverse portion of the casing remote, said casing having apertures at opposite ends, a holder for objects to be viewed mounted in said casing between said apertures, a colored glass in said casing adapted to be moved to a vertical position adjacent said holder, a control element for manipulating said glass projecting outside the casing, a door hinged in the upper wall of said casing and adapted when in closed position to constitute a part of said casing, a light reflector at said door, means for adjusting said reflector, and means for holding the same in its adjusted position, spaced magazines in the transverse part of said casing, and means operable from the outside of said casing to move objects to be viewed through said holder from one magazine to the other, light diffusing means in the aperture at one end of said casing, and means in the opposite aperture for viewing objects in said holder comprising a spectacle frame, lenses in said frame, and means interposed between said frame and casing for adjusting said lenses comprising a member engageable outside said casing.

6. A hand supportable stereoscope comprising a substantially T-shaped casing said casing having apertures at opposite ends, a holder in said casing between said apertures adapted to hold objects to be viewed, a colored glass in said casing adapted to be moved to a position at one side of said holder, a control element for manipulating said glass, a light reflector in the wall of said casing, constituting a part thereof, means for adjusting said reflector, and means for holding the same in its adjusted position, spaced magazines in said casing, and means for moving objects to be viewed through said holder from one magazine to the other, light diffusing means adjacent the aperture at one end of said casing, and means adjacent the opposite aperture for viewing objects in said holder comprising a spectacle frame, lenses in said frame, and means for adjusting said lenses.

7. A hand supportable stereoscope comprising a casing provided with apertures, a holder between two of said apertures, a colored glass in said casing adapted to be moved to a position at one side of said holder, a reflector adjustable in the wall of said casing, spaced magazines for said casing and means for moving objects to be viewed through said holder from one magazine to the other, light diffusing means in one of said apertures, and means in the other aperture for viewing objects in said holder.

8. A stereoscope adapted to be held to the eyes comprising a casing provided with apertures, a view holder between two of said apertures, a colored glass adapted to be moved to a position next to said holder, a reflector adjustable in said casing, a magazine for said casing and means for moving objects from said magazine in front of one of said apertures to be viewed through said holder, and means in the other of said apertures for viewing objects in said holder.

9. A hand supportable stereoscope comprising a casing having apertures, means for supporting a view between two of said apertures, a holder pivotally mounted within said casing adapted to be moved to a position at one side of said means, glass of different colors for each eye of the observer mounted on said holder, an adjustable reflector on said casing, and means in one of said apertures for viewing said objects in said holder comprising a lens for each of a pair of colored glasses.

10. A hand supportable stereoscope comprising, a casing having apertures at opposite ends, a holder for objects to be viewed mounted in said casing between said apertures, a colored glass in said casing adapted to be moved to a vertical position adjacent said holder, a door hinged in the upper wall of said casing and adapted when in closed position to constitute a part of said casing, a light reflector on said door, means for adjusting said reflector, and means for holding the same in its adjusted position, light diffusing means in the aperture at one end of said casing, and means in the opposite aperture for viewing objects in said holder.

11. A hand supportable stereoscope comprising a casing having a pair of apertures in each end, lenses adjustably positioned in the apertures at one end, a frame pivotally mounted to the other end of said casing and having an inner and an outer pair of apertures in alinement with the apertures in said casing, light diffusing means in the outer apertures of said frame, and means for feeding material between the adjacent apertures of said casing and said frame.

12. A hand supportable stereoscope comprising a casing having a pair of apertures at each end, lenses positioned in the apertures at one end of said casing, means for feeding material outside of said casing across the apertures at the other end of said casing, a holder hinged within said casing and adapted to be moved into a vertical position adjacent to said last mentioned apertures, colored glasses mounted in said holder, and means for supporting said holder in any adjusted position.

In testimony whereof we have hereunto set our hands.

WILLIAM P. DUN LANY.
STEPHEN G. WOOD.